United States Patent [19]
Wade

[11] 3,891,417
[45] June 24, 1975

[54] FILTER AND SORBENT CARTRIDGE

[75] Inventor: William D. Wade, Chelsea, Mich.

[73] Assignee: King Engineering Corporation, Ann Arbor, Mich.

[22] Filed: Jan. 28, 1974

[21] Appl. No.: 437,467

[52] U.S. Cl. ............... 55/274; 55/316; 55/387; 55/487; 55/524; 55/527
[51] Int. Cl. ................................ B01d 50/00
[58] Field of Search ............ 55/274, 275, 316, 482, 55/485–487, 498, 502, 510, 387, 524, 527; 210/94, 95, 315, 317, 502, 489–491

[56] References Cited
UNITED STATES PATENTS

| | | | |
|---|---|---|---|
| 3,252,270 | 5/1966 | Pall et al. | 55/486 |
| 3,312,351 | 4/1967 | Kasten | 210/315 |
| 3,353,339 | 11/1967 | Walter | 55/316 |
| 3,375,933 | 4/1968 | Rodman | 210/502 |
| 3,455,459 | 7/1969 | Troy | 210/489 |
| 3,527,027 | 9/1970 | Knight et al. | 55/275 |
| 3,708,965 | 1/1973 | Domnick | 210/489 |

Primary Examiner—Bernard Nozick
Attorney, Agent, or Firm—Harness, Dickey & Pierce

[57] ABSTRACT

A filter cartridge for removing a liquid contaminant such as an oil dispersoid from a gaseous fluid such as compressed air comprising a bed of sorbent medium disposed between inner and outer rigid tubes formed of glass microfibers. The inner tube acts as a first filtering stage by condensing or coalescing a majority of the dispersoid contaminant from the gas, and the outer tube acts as a polishing filter for removing most of any contaminant not removed by the inner tube and the bed of sorbent medium. The filter cartridge can optionally provide a progressive color change indication toward the end of its useful life through the use of a dye substance disposed in the bed between the inner and outer fiber tubes. As the bed of sorbent medium becomes substantially saturated with liquid contaminant such contaminant is colored by the dye and begins to progressively penetrate through the outer tube to provide a progressive color change which is visible before the filtering effectiveness of the cartridge is seriously impaired.

18 Claims, 2 Drawing Figures

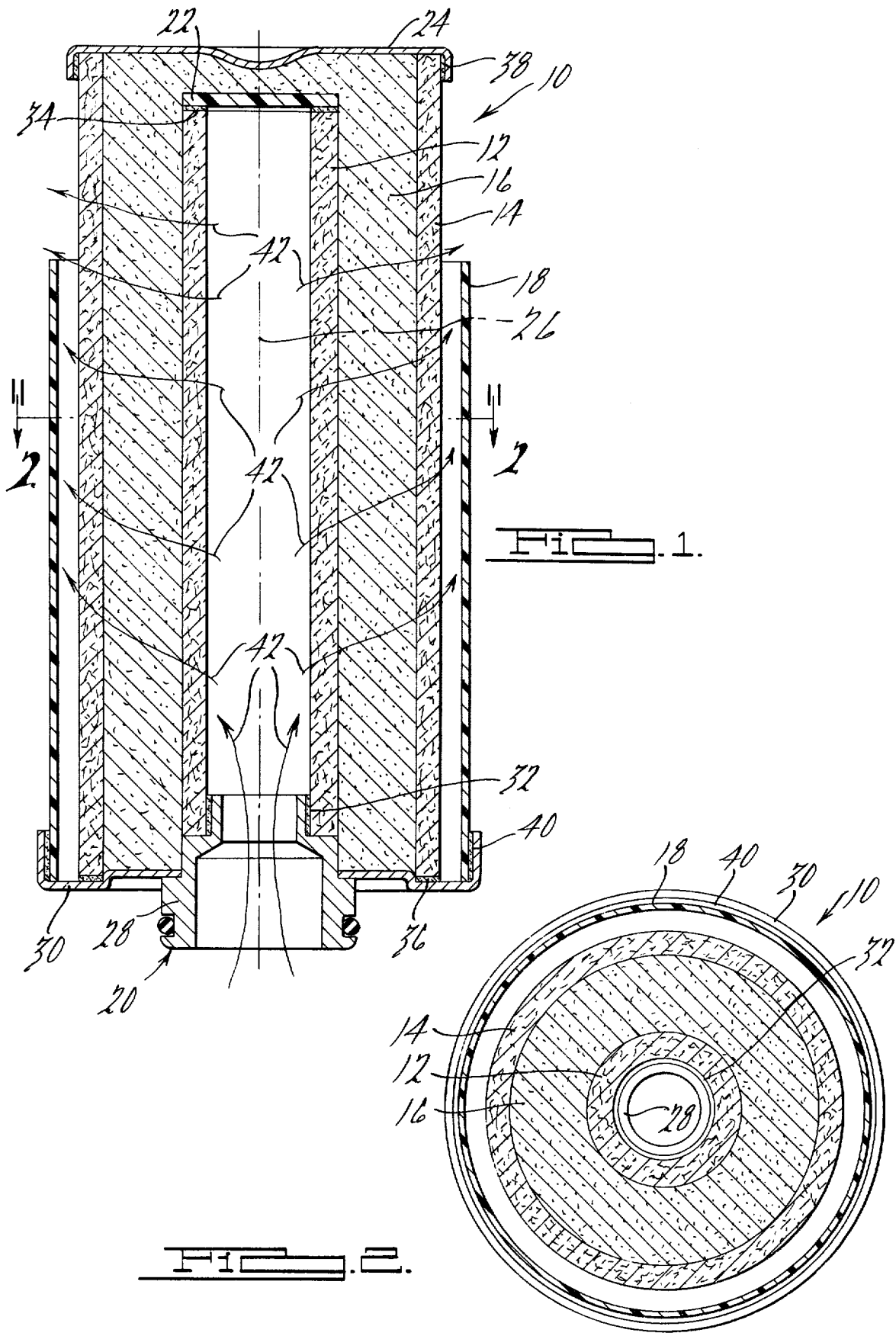

FILTER AND SORBENT CARTRIDGE

BACKGROUND AND SUMMARY OF THE INVENTION

The present invention pertains to a novel filter cartridge for filtering liquid contaminant from a gaseous fluid. The cartridge exhibits an improved filtering life and can be structured to provide a progressive color change indication toward the end of its useful life before its filtering effectiveness is seriously impaired.

In ordinary compressed air systems oil from the air compressing equipment is often a contaminant in the compressed air. Accordingly, the conventional practice is to provide a filter downstream of the compressing equipment to remove the oil dispersoid and droplets from the compressed air. One common problem with most filters is that they eventually clog or quit filtering and require replacement, some on a rather frequent basis.

One aspect of the present invention, therefore, concerns the provision of an improved filter which exhibits a longer useful life than many known filters of this type, this improvement being attained without a complicated filter structure, thus giving the invention the added advantage of being relatively economical.

A further problem with such filters is the difficulty in determining when filtering effectiveness begins to deteriorate. Obviously, it is undesirable to keep a clogged filter in the system, yet it is also undesirable to replace a filter prematurely. In an attempt to solve this problem, color change filter cartridges have been developed. Basically, a color change filter cartridge is intended to provide a visible indication of the amount of contaminant retained in the filter and thereby provide maintenance personnel an indication when the filter cartridge should be replaced. Unfortunately, the prior art of which applicant is aware has fallen short of attaining an effective color change cartridge. With such prior color change cartridges, a color change indication is often given only after the filtering effectiveness of the cartridge has already seriously deteriorated; the color change may lack any semblance of significant time progression; and/or color prominence is often poor.

A further aspect of the present invention, therefore, resides in the provision of a novel color change filter cartridge in which a color change indication is given before the filtering efficiency of the cartridge seriously degrades, the color change exhibits an appreciable time progression thereby affording ample time in which to replace the filter cartridge before its filtering efficiency deteriorates to a danger level, and a prominent color change is given.

The foregoing features of the invention, along with additional advantages thereof, will be seen in the ensuing description and claims which are to be taken in conjunction with the accompanying drawing.

In the drawing:

FIG. 1 is a vertical longitudinal sectional view through a filter cartridge embodying principles of the present invention;

FIG. 2 is a horizontal transverse sectional view taken along the line 2—2 in FIG. 1.

DESCRIPTION OF THE PREFERRED EMBODIMENT

In the drawing, a filter cartridge 10 embodying the principles of the present invention comprises: an inner filter tube 12; an outer filter tube 14 disposed around inner tube 12; a sorbent medium 16 disposed between filter tubes 12 and 14; an impervious transparent outer tube 18 around outer filter tube 14; a cap and stud assembly 20 at the bottom of the cartridge; a plastic closure disc 22 for the upper end of inner tube 12; and a cap 24 for the upper end of the cartridge. These elements are concentrically arranged with respect to the longitudinal axis 26 of the cartridge. Cap and stud assembly 20 comprises a conventional stud 28 and an annular cap 30 assembled in sealing relation onto stud 28, for example, by brazing. The lower end of inner filter tube 12 seats on a shoulder of stud 28, and the two are secured together in sealing relation by conventional adhesive or cement 32. Disc 22 closes the open upper end of inner filter tube 12 and is sealingly adhered thereto by conventional adhesive 34. The lower end of outer filter tube 14 seats on cap 30 and is adhered thereto in sealing relation by adhesive 36. Sorbent medium 16 fills the space between inner and outer filter tubes 12 and 14, with outer filter tube 14 extending somewhat above inner tube 12 to permit sorbent medium 16 to totally enclose inner tube 12. End cap 24 sealingly closes the upper end of the cartridge around outer filter tube 14 and is affixed in place by adhesive 38. Transparent tube 18 is supported on cap 30 in spaced relation to outer filter tube 14 with the lower periphery of tube 18 sealed to cap 30 by adhesive 40.

Filter cartridge 10 is intended for installation, preferably with axis 26 vertical, in a cartridge receptacle connected in a fluid pressure line and preferably to filter a liquid dispersoid contaminant from a gaseous fluid as it flows through the cartridge. The construction of the cartridge receptacle is not critical in relation to the present invention and can be in accordance with known principles. For example, the receptacle may comprise a sealed shell or housing surrounding the cartridge and should include a mounting for the cartridge whereby the fluid to be filtered enters the cartridge through the base of stud 28 to pass through the cartridge in the direction indicated by arrows 42. Filtered discharge may exit the receptacle from any desired point.

The preferred embodiment of the invention disclosed in the drawing is intended to provide a two-stage graded filter for filtering oil from compressed air, although it will be appreciated that the principles of the invention are applicable to other filter structures and fluid systems. Both filter tubes 12 and 14 are relatively rigid glass-fiber tubes composed of microfibers of substantially uniform diameter, such as borosilicate glass fibers, bonded together by a suitable inert bonding material, such as epoxy resin. For example, tubes of this type are commercially available from W & R Balston, Ltd., Lexington, Mass. With the illustrated construction wherein the direction of flow is from the inner tube to the outer tube, inner filter tube 12 is selected to have a lower retention efficiency (for example, 91% as measured by the DOP test) than outer filter tube 14 (for example, 99.25% as measured by the DOP test). The tubes preferably have a wall thickness sufficient to permit them to act as a depth type filter in which the particles are retained inside the filter as the fluid courses a torturous path therethrough, rather than as a sieve type filter, which uses a pore size smaller than the particles to retain them on the upstream filter surface, the former type yielding a smaller pressure drop and being less susceptible to clogging. The bed of sorbent medium 16 may be composed of any material capable of sorbing the liquid contaminant being filtered, yet capable of permitting flow through the cartridge without undue pressure differential. For example, a suitable material for sorbent medium 16 is diatomaceous earth, a specific commercially available satisfactory grade of which is Eagle-Picher Floor Dry.

As compressed air containing oil as a contaminant passes through the filter in the direction indicated by arrows 42, inner filter tube 12 acts as a primary filter to filter from the compressed air most of the oil dispersoid which may be present therein. As it begins to saturate with oil it functions increasingly as a condenser or coalescer, wherein the small dispersoid particles of oil are coalesced into larger drops. Saturation generally begins at the bottom (probably due to gravity) and moves upwardly as the flow seeks passage through the unsaturated portions of the tube which present less of a pressure drop, the flow always seeking the path of least resistance. Upon saturation of the tube the excess oil, which is now in relatively large conglomerate drops, is readily sorbed by the bed of sorbent medium 16 in contact with the entire outer surface thereof. Because of its sorbent capability, sorbent medium 16 acts like a sponge to sorb all coalesced oil or contaminant from the inner tube. The sorbent capability of sorbent medium 16 is intended to encompass any capability of the medium to retain liquid contaminant therein; i.e., either by permitting the contaminant to penetrate into the material constituting the medium and/or by mechanically retaining the contaminant by a mechanical phenomenon such as capillary action, surface tension, etc. Without inner tube 12 much of the dispersoid contaminant would, because of its small size, merely pass through bed 16 without being removed. The coalescing of these particles into larger droplets by tube 12 is what gives highly sorbent bed 16 the capability of removing large quantities of contaminate, thus giving the cartridge a relatively long life.

Outer filter tube 14 is of sufficiently high arrestance to act as a polishing filter to remove most all liquid and solid contaminants which may pass through or emit from inner filter tube 12 and sorbent medium 16. Because of the differential arrestance of the two tubes, minute particles of solid contaminant in the air will pass through the inner tube, thereby minimizing clogging of the tube, and will be subsequently removed by outer tube 14.

The cartridge will continue to operate efficiently until bed 16 is fully saturated with oil contaminant, at which time oil particles will start to pass into outer tube 14. As the outer filter tube begins to saturate, the nonsaturated upper portion thereof will remain effective to continue filtering contaminant from the fluid. This is because the saturated portion will present a greater resistance to flow, and since it seeks the path of least resistance the flow will therefore be through the nonsaturated portion. Hence, saturation of the outer filter tube is a progressive phenomenon which does not immediately seriously degrade the filtering efficiency of the cartridge. When the outer tube is fully saturated, the cartridge has reached the end of its useful life.

The dimensions and specific structural details of a filter cartridge embodying principles of the present invention can be selected using known techniques. Preferably, the effective area of the filter is made sufficiently large that pressure drops are tolerable and the fluid exhibits a sufficiently low velocity in passing through the filter to avoid channeling. Although the particular shape of the cartridge is cylindrical, it will be appreciated that other shapes may be used if desired. Outer tube 18 serves the purpose of preventing liquid oil which accumulates in the cartridge as it saturates from escaping into the filtered air in the surrounding receptacle, providing a reservoir in which such oil can accumulate. Hence, the accumulated oil is not carried into the system along with the filtered air. Preferably, the height of tube 18 is at least one-half the height of outer tube 14.

In accordance with a further important feature of the invention, a color substance, such as a dye, may be provided to give a visual indication of the state of saturation and amount of remaining life of the cartridge. It has been discovered that reliable, significant, visual results are obtained by uniformly dispersing a color substance or dye uniformly throughout sorbent medium 16. This can be done either by mechanically mixing the two, by actually dyeing the medium, by both, or by other techniques which are known in the art. The color substance must be at least partially soluble in the contaminant. Where the contaminant is oil, as in the example of the preferred embodiment, an oil-soluble dye such as an oil soluble aniline dye has been found especially suitable. In an unused cartridge, the color of the color substance is not visible since outer filter tube 14 encloses sorbent medium 16. As sorbent medium 16 begins to saturate with oil the color of the color substance dissolves in and colors the oil therein. After the bed of sorbent medium has become fully saturated with oil the colored oil will start penetrating into outer filter tube 14 and a color change in the outer surface thereof will immediately occur. The color change will progressively propagate upwardly from the bottom of the outer filter tube, probably because the liquid oil will initially gravitate to the bottom thereof, and the color prominence will increase with time. As the color change takes place, the outer filter tube nevertheless remains effective above the level of the visible color.

Although the rate of time progression of the color change will obviously depend upon the amount of contamination in the fluid being filtered, flow rates, cartridge size, etc., a color change cartridge embodying the principles of the present invention will exhibit, in normal operation, a significant time progression before the cartridge efficiency seriously degrades. In practice it has been found desirable to replace the cartridge when approximately one-half the height of the outer tube shows the color. While the filter cartridge of the present invention is effective as a filter regardless of its particular orientation, the color change indication is best given if the axis of the cartridge is substantially vertical, as shown and described above. When the color change feature is incorporated in a filter pursuant to the invention, outer tube 18 should be transparent and the receptacle for the cartridge should either be transparent or include a transparent window so that at least a portion of the outer surface of the cartridge (preferably its entire surface) can be viewed.

It is to be understood that the foregoing description is that of preferred embodiments of the invention. Various changes and modifications may be made without departing from the spirit and scope of the invention as defined by the appended claims.

What is claimed is:

1. A filter cartridge for filtering a liquid contaminant from a gaseous fluid, comprising: a first tubular element formed of a filter medium capable of filtering said contaminant; a second tubular element formed of a filter medium capable of filtering said contaminant and surrounding and spaced from said first tubular element; an oil sorbent medium disposed in the annular space between said two tubular elements, both tubular elements being of substantially thickness integrally formed and of sufficient rigidity to support said sorbent medium, and comprising glass microfibers bonded together by a binder; a first sealing closure of one end of said filter cartridge; a second sealing closure at the other end of said cartridge; and a central entrance tube extending through said second sealing closure and communicating with the interior of said first tubular element, whereby the gaseous fluid to be filtered will enter said interior and pass outwardly through said tubular elements and sorbent medium.

2. The invention defined in claim 1, further comprising an impervious sheath surrounding the lower portion of said second tubular element in spaced relationship with respect thereto and connected to said second closure.

3. The invention defined in claim 1, wherein said sorbent medium comprises diatomaceous earth.

4. The invention defined in claim 1, wherein one of said tubular elements has a greater arrestance than the other.

5. The invention defined in claim 1, wherein at least one of said tubular elements comprises borosilicate glass fibers.

6. The invention defined in claim 1, wherein said sorbent medium covers substantially the entire outer surface of said first tubular element.

7. The invention defined in claim 1, wherein said first tubular element has a lower arrestance than said second tubular element.

8. The invention defined in claim 1, including means defining a reservoir around the outside of said second tubular element and connected to said second closure.

9. The invention defined in claim 8, wherein said reservoir has an axial dimension not less than approximately one-half the axial dimension of said second tubular element.

10. The combination according to claim 1, further provided with a color substance at least partially soluble in said contaminant disposed between said inner and outer tubes.

11. The invention defined in claim 10, wherein said color substance is initially substantially evenly distributed throughout said sorbent medium.

12. The invention defined in claim 10, wherein said color substance is disposed in the vicinity of substantially the entire inner wall surface of said outer filter tube.

13. The invention defined in claim 10, wherein said inner filter tube has a lower arrestance than said outer filter tube.

14. The invention defined in claim 10, wherein said first medium comprises borosilicate glass microfibers.

15. The invention defined in claim 10, wherein said color substance is a dye.

16. The invention defined in claim 15, wherein said dye is an aniline dye.

17. The invention defined in claim 10, wherein said sorbent medium comprises diatomaceous earth.

18. The invention defined in claim 17, wherein said color substance is a dye sorbed into the diatomaceous earth.

* * * * *